(12) United States Patent
Takahara et al.

(10) Patent No.: US 6,968,543 B2
(45) Date of Patent: Nov. 22, 2005

(54) INFORMATION PROCESSING APPARATUS

(75) Inventors: Koji Takahara, Kawasaki (JP); Masaki Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 403 days.

(21) Appl. No.: 09/729,390

(22) Filed: Dec. 4, 2000

(65) Prior Publication Data

US 2001/0054177 A1 Dec. 20, 2001

(30) Foreign Application Priority Data

Mar. 10, 2000 (JP) ........................................ 2000-072446

(51) Int. Cl.⁷ .............................. G06F 9/45; G06F 9/44
(52) U.S. Cl. ...................................... 717/140; 717/163
(58) Field of Search ................................ 717/124–135, 717/140, 163, 144, 145, 154, 158, 170; 714/38, 48; 700/169

(56) References Cited

U.S. PATENT DOCUMENTS

| | | | | |
|---|---|---|---|---|
| 4,887,220 A | * | 12/1989 | Kiya et al. ................... | 700/169 |
| 4,953,084 A | * | 8/1990 | Meloy et al. ................. | 717/131 |
| 5,583,988 A | * | 12/1996 | Crank et al. ................... | 714/48 |
| 5,586,325 A | * | 12/1996 | MacDonald et al. ........ | 717/153 |
| 5,590,329 A | * | 12/1996 | Goodnow et al. .......... | 717/144 |
| 5,613,063 A | * | 3/1997 | Eustace et al. ............... | 714/38 |
| 5,615,369 A | * | 3/1997 | Holler ......................... | 717/158 |
| 5,758,163 A | * | 5/1998 | Safonov ...................... | 717/144 |
| 5,764,883 A | * | 6/1998 | Satterfield et al. ............ | 714/38 |
| 6,085,029 A | * | 7/2000 | Kolawa et al. ............... | 714/38 |
| 6,110,227 A | * | 8/2000 | Marcelais et al. .......... | 717/170 |
| 6,219,834 B1 | * | 4/2001 | Soroker et al. ............. | 717/145 |
| 6,427,234 B1 | * | 7/2002 | Chambers et al. .......... | 717/140 |
| 6,434,741 B1 | * | 8/2002 | Mirani et al. ................ | 717/124 |
| 6,523,097 B1 | * | 2/2003 | Liedtke et al. .............. | 711/154 |
| 6,634,020 B1 | * | 10/2003 | Bates et al. .................. | 717/131 |
| 6,647,547 B1 | * | 11/2003 | Kanamaru et al. .......... | 717/151 |

FOREIGN PATENT DOCUMENTS

| | | | | | |
|---|---|---|---|---|---|
| JP | 62256137 A | * | 11/1987 | ............. | G06F/9/44 |
| JP | 63174130 A | * | 7/1988 | ............. | G06F/9/06 |
| JP | 02072428 A | | 3/1990 | | |
| JP | 03240828 A | | 10/1991 | | |
| JP | 07152601 A | | 6/1995 | | |

* cited by examiner

*Primary Examiner*—Kakali Chaki
*Assistant Examiner*—Trenton Roche
(74) *Attorney, Agent, or Firm*—Greer, Burns & Crain, Ltd.

(57) ABSTRACT

An information processing apparatus that enables an undefined variable reference check on a dynamic variable. A dynamic variable specifying section specifies target dynamic variables from a source file. An area specifying section specifies areas ensured in the case of dynamic variables specified by the dynamic variable specifying section being developed into a memory at the time of executing a load module. An initializing section initializes areas specified by the area specifying section to a predetermined value.

11 Claims, 14 Drawing Sheets

```
                    ┌─40
PROGRAM MAIN
COMMON /ALK/X1(1000), X2(1000)
COMMON /BLK/X3(1000)
END
```

COMPILE

```
                    ┌─41
          ⋮
.commonnew1 alk,8000
.commonnew2 blk,4000
          ⋮
```

FIG. 8

```
                    ⎡70
                    PROGRAM MAIN
                    COMMON /BLK/X(1000)
                            .
                            .
                            .
                    WRITE(6,'(8Z)') X(1)
                    END
```

FIG. 11

```
         ┌80
PROGRAM MAIN
COMMON /BLK/X(1000)
         .
         .
         .
Y=X(1)+1
END
```

FIG. 12

```
                 ┌─90
┌─────────────────────────────┐
│ PROGRAM MAIN                │
│ REAL A(1000),B(1000)        │
│ DO I=1,1000                 │
│     A(I)=1.0                │
│ ENDDO                       │
│ DO I=1,1001                 │
│     B(I)=A(I)               │
│ ENDDO                       │
└─────────────────────────────┘
```

FIG. 13

INFORMATION PROCESSING APPARATUS

BACKGROUND OF THE INVENTION

1. Field of the Invention

This invention relates to an information processing apparatus and, more particularly, to an information processing apparatus for translating source code including dynamic variables into object code by a compiling process and converting the object code into an executable load module by a linking process in order to execute.

2. Description of the Related Art

Variables used in languages, such as FORTRAN or C, can be classified into two types by mode of arrangement into a memory at execution time: static variables and dynamic variables. The allocation of a static variable to a storage area is constant regardless of the process of executing a program. On the other hand, the allocation of a dynamic variable to a storage area is performed during executing a program.

When a program is described in such a language, the initial value of a variable used must be set. If a variable the initial value of which is not set is referred to, an unexpected error may occur because the value of the variable remains unfixed.

The same problem exists with an array. That is to say, with an array, an array subscript outside a declared scope means that an undefined area is referred to, so the same problem with the above case will arise.

Conventionally, the following two methods are generally used to check whether a variable not initialized is referred to (undefined variable reference check):

(1) An instruction to initialize a target variable to a predetermined value is added to a program and the judgement that an undefined variable is referred to is made in the case of the predetermined value being detected at the time of executing the program.

(2) A compiler substitutes a predetermined initial value for a target variable at compile time and the judgement that an undefined variable is used is made in the case of the value being detected at the time of executing a program.

Furthermore, the following two methods are generally used to check whether an array subscript outside a declared scope is referred to (array subscript check):

(3) A programmer directly refers to the contents of an array subscript by, for example, adding an instruction to print out an array subscript to a program and judges.

(4) A compiler detects an instruction to refer to an array from a program at compile time and adds new instructions before and behind the instruction in order to check whether an array subscript is within the proper scope.

In methods (1) and (3), a programmer needs to add a new instruction by manual input, which is troublesome.

In methods (2) and (4), a program needs to be recompiled, which is inefficient for a program that takes a long time to compile.

Moreover, in methods (2) and (4), the above dynamic variables cannot be initialized. This will now be described in detail The allocation of a dynamic variable to a memory area is determined when a program is executed and where a dynamic variable is allocated is managed by an operating system (OS). Therefore, in order to initialize the contents of a dynamic variable to a predetermined value, it is necessary to know the memory area to which the dynamic variable was allocated by the OS. Conventionally, however, there has been no such method, so it has been difficult to initialize a dynamic variable to an arbitrary value.

SUMMARY OF THE INVENTION

In order to address such a problem, the present invention was made. In other words, an object of the present invention is to provide an information processing apparatus that can initialize a dynamic variable to an arbitrary value by a debug option.

In order to achieve the above object, an information processing apparatus for translating a source file including dynamic variables into an object file by a compiling process and converting it into an executable load module by a linking process is provided. This information processing apparatus comprises dynamic variable specifying means for specifying target dynamic variables from the source file, area specifying means for specifying areas ensured in the case of dynamic variables specified by the dynamic variable specifying means being developed into a memory at the time of executing the load module, and initializing means for initializing areas specified by the area specifying means to a predetermined value.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 is a view for describing how to allocate target variables to a new data section;

FIG. 11 shows an example of source files in the case of doing undefined variable reference checks;

FIG. 12 shows an example of source files in the case of doing undefined variable reference checks with a trap conforming to ANSI/IEEE 754 standard;

FIG. 13 shows an example of a source file for checking whether an array subscript outside a defined scope is used;

DESCRIPTION OF THE PREFERRED EMBODIMENT

An embodiment of the present invention will now be described with reference to the drawings.

Figure 1:
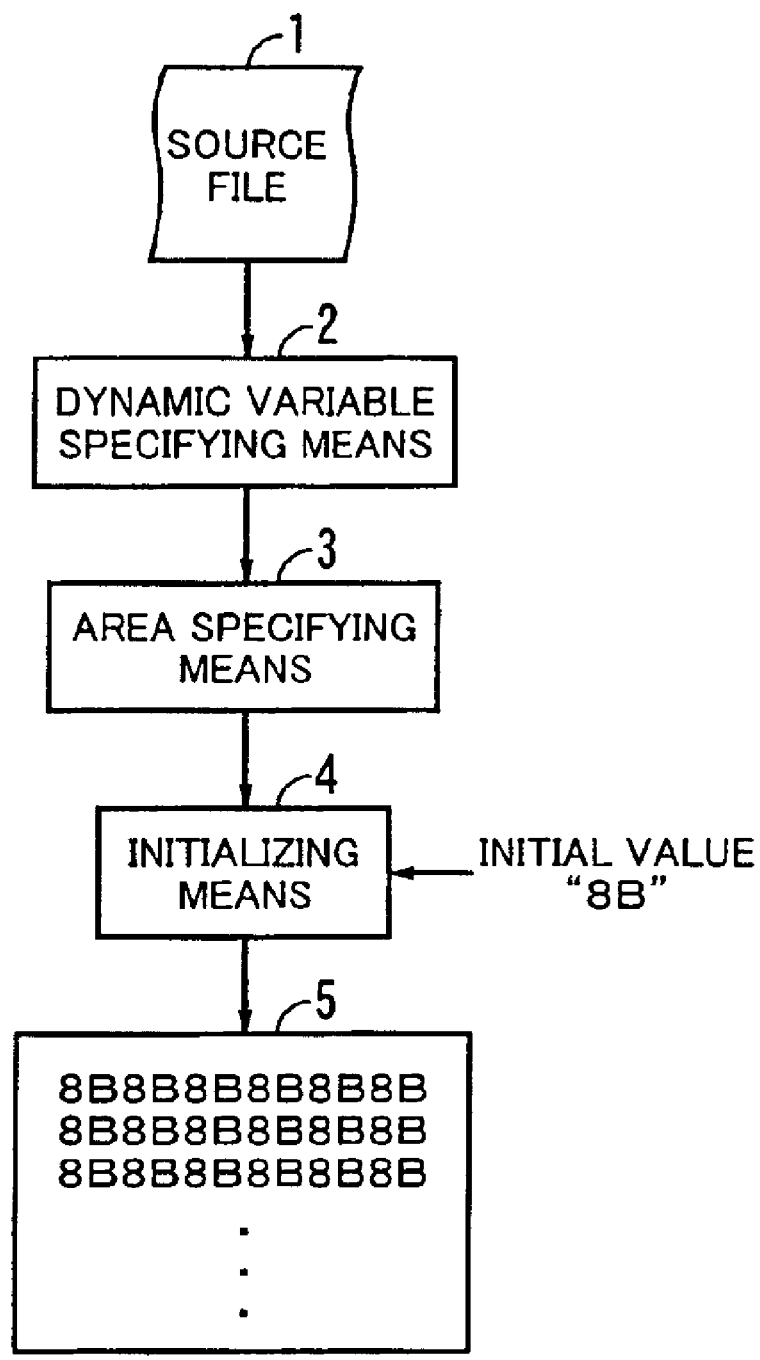
FIG. 1 is a view for describing the operating principle of the present invention.

FIG. 1 is a view for describing the operating principle of the present invention. In FIG. 1, source code is a program described in, for example, FORTRAN or C and includes dynamic variables.

Dynamic variable specifying means 2 specifies target dynamic variables from a source file 1.

Area specifying means 3 specifies areas ensured in the case of dynamic variables specified by the dynamic variable specifying means 2 being developed into a memory at execution time.

Initializing means 4 initializes areas specified by the area specifying means 3 to a predetermined value.

A memory 5 stores a load module which is generated by compiling and linking the source file 1.

Operations in FIG. 1 will be now described.

It is assumed that the source file 1 including dynamic variables is input. The dynamic variable specifying means 2 specifies dynamic variables from the source file 1.

The area specifying means 3 specifies areas when dynamic variables specified by the dynamic variable specifying means 2 are developed into the memory 5. Specifically, the area specifying means 3 obtains relative addresses (starting and ending addresses) in an object file where object code regarding the target dynamic variables is stored and supplies them to the initializing means 4.

The initializing means 4 specifies absolute addresses in the memory where dynamic variables are stored on the basis of the starting address (absolute address) of the memory storing the object code and the above starting and ending addresses (relative addresses) at the time of a program being executed and initializes these areas to a value ("8B" for this example) specified by, for example, a debug option.

As a result, areas in the memory 5 where dynamic variables are allocated will be initialized to a predetermined value.

With an information processing apparatus according to the present invention, as stated above, a dynamic variable can be initialized to an arbitrary value, so an undefined variable reference check on a dynamic variable can be done by specifying a debug option.

An embodiment of the present invention will now be described with reference to FIGS. 2 and 3.

Figure 2:
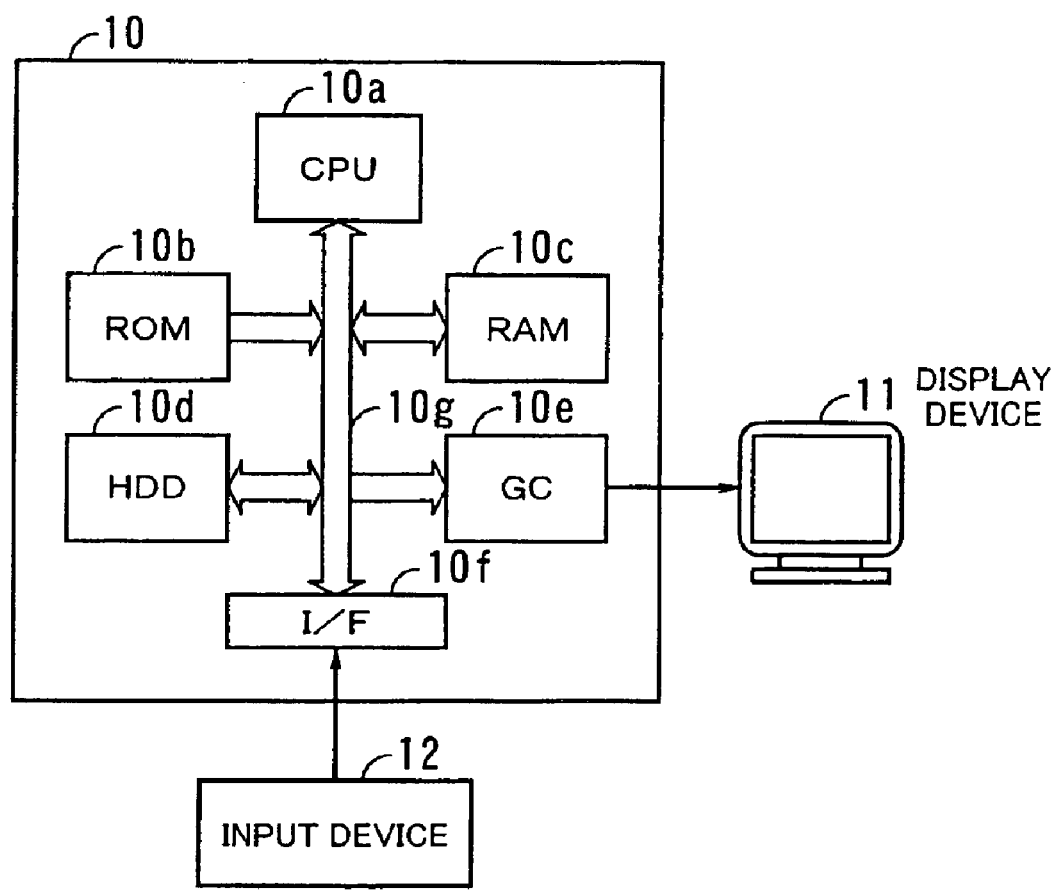
FIG. 2 is a block diagram showing the configuration of an embodiment of the present invention.

FIG. 2 is a block diagram showing the configuration of the embodiment of the present invention. As shown in FIG. 2, an information processing apparatus 10 according to the present invention comprises a central processing unit (CPU) 10a, a read only memory (ROM) 10b, a random access memory (RAM) 10c, a hard disk drive (HDD) 10d, a graphics card (GC) 10e, an interface (I/F) 10f, and a bus 10g. Furthermore, a display device 11 and an input device 12 are externally connected to the information processing apparatus 10.

The CPU 10a controls each section of the apparatus and performs various operations in compliance with programs etc. stored in the HDD 10d.

The ROM 10b stores basic programs executed by the CPU 10a, data, and the like.

The RAM 10c temporarily stores programs being executed by the CPU 10a, data being operated by the CPU 10a, and the like.

The HDD 10d stores an OS which controls the whole system, compiler, debugger, linker, source file to be compiled, compiled object file, and the like.

The GC 10e performs a drawing process in accordance with a drawing command supplied from the CPU 10a, converts image data obtained to image signals, and outputs them to the display device 11.

The I/F 10f converts the format of data supplied from the input device 12 and inputs the data.

The bus 10g connects the CPU 10a, ROM 10b, RAM 10c, HDD 10d, GC 10e, and I/F 10f to one another and enables data exchange among them.

The display device 11 consists of, for example, a cathode ray tube (CRT) monitor and displays image signals supplied from the GC 10e.

The input device 12 consists of, for example, a keyboard or mouse, generates data in response to a user's operation, and provides it to the I/F 10f.

An OS, compiler, linker, source file, and object file are stored in the HDD 10d. These are read out at need, are developed into the RAM 10c, and are executed by the CPU 10a.

Figure 3:
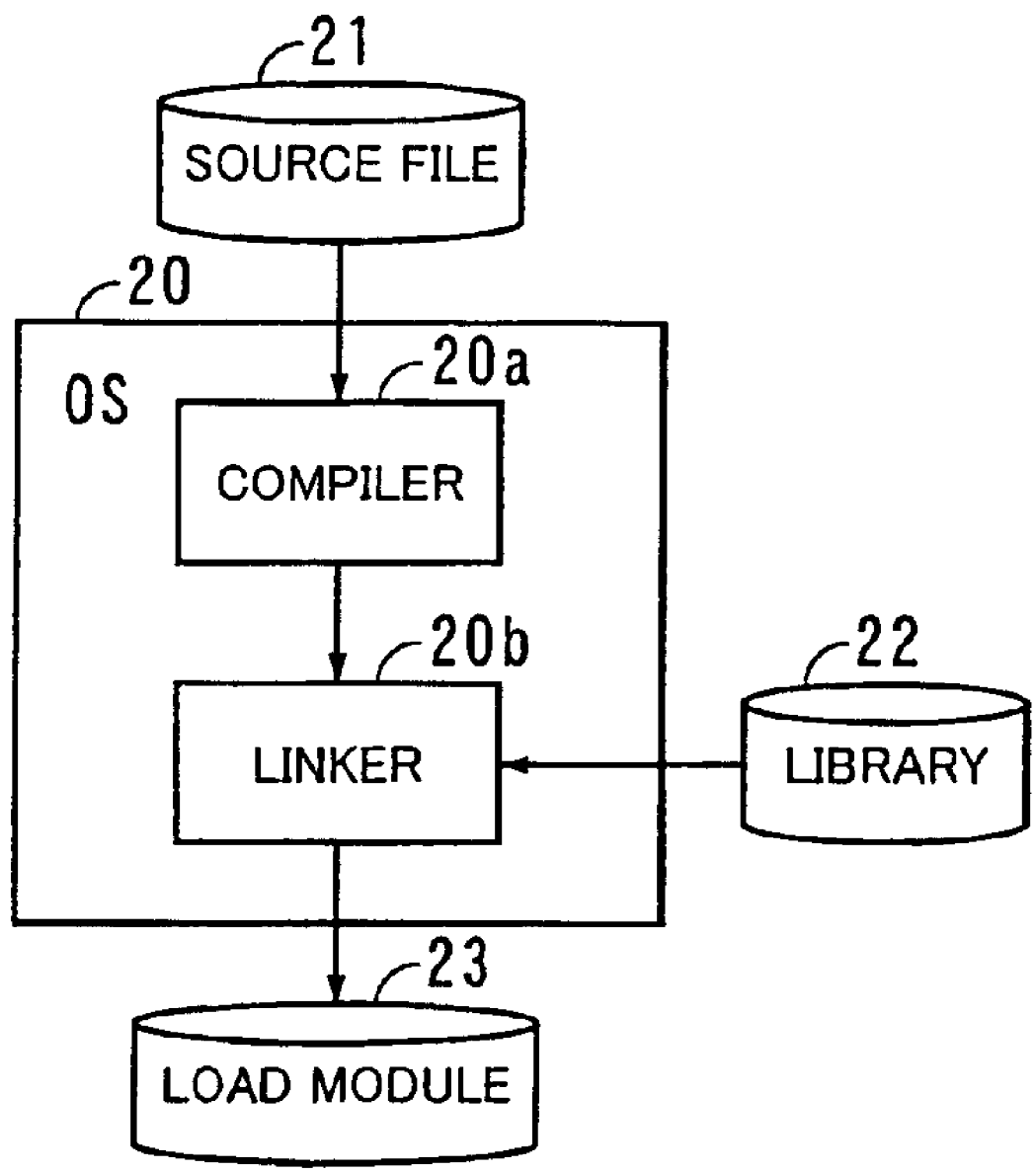
FIG. 3 is a view showing relations among an OS, compiler, linker, source file, library, and object file.

FIG. 3 is a schematic showing relations among an OS 20, compiler 20a, linker 20b, source file 21, library 22, and load module 23.

As shown in FIG. 3, the OS 20 manages execution of the compiler 20a and linker 20b, reads out, at their request, the source file 21 and library 22 stored in the HDD 10d, and stores the load module 23 generated in the HDD 10d. Furthermore, when a request to execute a load module is made from the input device 12, the OS 20 reads out the load module stored in the HDD 10d and executes it.

The library 22 consists of, for example, a mathematical function library for operating a mathematical function and an initialization library for performing an initializing process in the case of executing a load module and is read out at need when a linking process is performed by the linker 20b.

Figure 4:
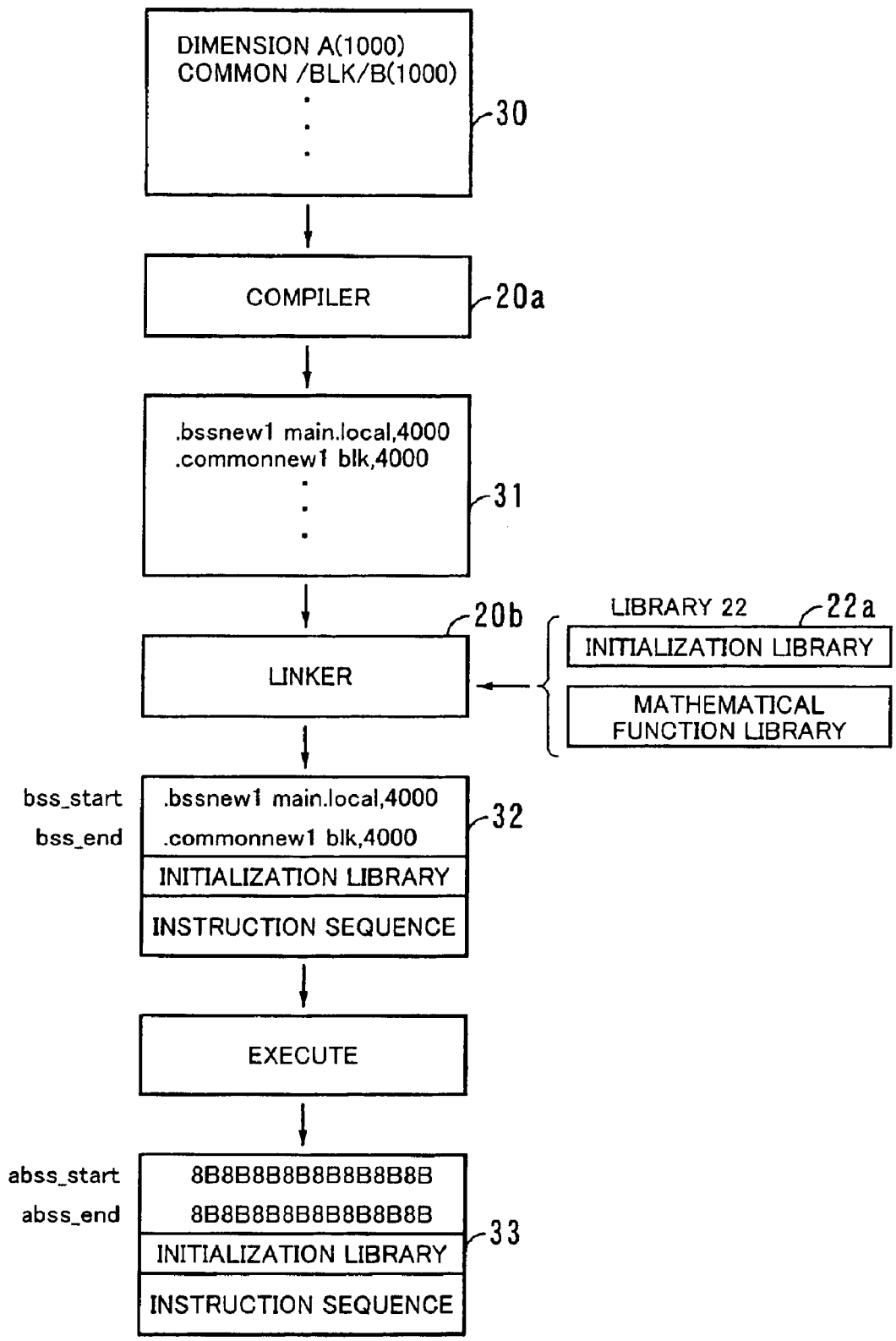
FIG. 4 is a view for describing operations in the embodiment of the present invention roughly.

Now, operations in the embodiment of the present invention will be described roughly with reference to FIG. 4. First, when a source file 30 is supplied to the compiler 20a, the compiler 20a detects dynamic variables included in the source file 30. In this example, array A (local variable without an initial value) declared by "DIMENSION A(1000)" and array B (global variable without an initial value) declared by "COMMON /BLK/B(1000)" are detected as target dynamic variables.

Next, the compiler 20a embeds the detected dynamic variables in an object file as variables in a new data section, performs a compiling process on other instruction groups described in the source file 30, and then outputs an object file 31 obtained.

In this example, object code ".bssnew1 main.local,4000" and ".commonnew1 blk,4000" given "enew1" which means a new data section is described in the object file 31. In this case, "bss" means a section name,"main" and "local" mean a local variable belonging to a main function, and "4000" means that an area of 4000 bytes (a single-precision real number consists of 4 bytes) is ensured. "common" means a common variable and "blk" is a name given to the area ensured.

If a compiling process is performed on the same program with a conventional compiler, then ".bss main.local,4000" and ".common blk,4000," which differ materially from the above only in not including "new1," are output.

The linker 20b performs a linking process on the object file 31 output from the compiler 20a. That is to say, first, the linker 20b reads out an initialization library 22a and necessary libraries from the library 22 and adds them to the object file 31.

The initialization library 22a consists of an instruction group to be executed first in the case of executing a load module. In this embodiment, an initializing process on a target dynamic variable will be performed with the initialization library 22a.

Then the linker 20b searches a new data section included in the object file 31 for a variable. If a variable is detected in the new data section, the linker 20b obtains relative starting address (distance from the starting point of an object program) bss_start and relative ending address bss_end of an area where the variable is stored. The linker 20b passes relative addresses bss_start and bss_end obtained to the initialization library 22a previously given (embeds them at predetermined locations, for example).

And then the linker 20b integrates the object file by a linking process to generate an executable load module 32.

When the load module 32 is executed, the OS 20 reads out the load module 32 from the HDD 10d and arranges it in a predetermined area of the RAM 10c.

After the load module 32 is arranged in the RAM 10c, the initialization library 22a is executed to calculate starting address abss_start and ending address abss_end (absolute addresses) of an area to be initialized from relative addresses bss_start and bss_end and the starting address (absolute address) of the load module developed in the memory. Then an initial value ("8B" for this example) specified at the time of, for example, a program being executed will be written into an area in a memory 33 specified by calculated starting address abss_start and ending address abss_end.

The position where a dynamic variable is stored is undecided before it is arranged in a memory. With the above procedure, however, a dynamic variable can be initialized to an arbitrary value. As a result, an undefined variable reference check can be done by the use of a debug option.

A flow chart for realizing the above procedure will now be described.

Figure 5:
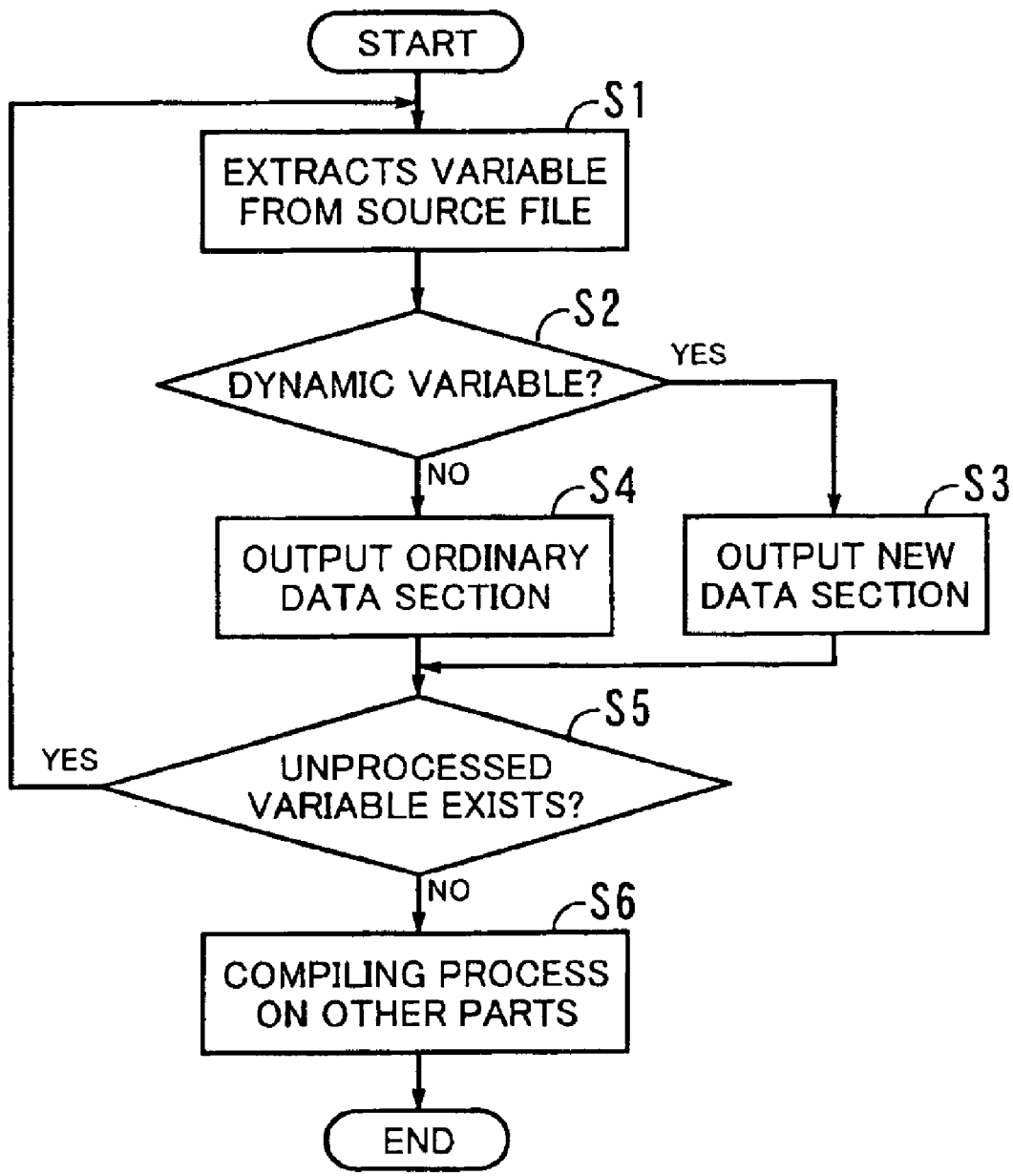
FIG. 5 is a flow chart for describing an example of processes performed by the compiler shown in FIG. 3.

FIG. 5 is a flow chart for describing an example of processes performed by the compiler 20a. The following procedure will be performed in compliance with this flow chart.

[S1] The compiler 20a extracts a predetermined variable from a source file to be compiled.

[S2] The compiler 20a judges whether or not the extracted variable is a dynamic one. If it is a dynamic variable, then the compiler 20a proceeds to step S3. If it is not a dynamic variable, then the compiler 20a proceeds to step S4.

[S3] The compiler 20a outputs object code regarding a new data section.

[S4] The compiler 20a outputs object code regarding an ordinary data section.

[S5] The compiler 20a judges whether there exists an unprocessed variable in the source file. If there exists an unprocessed variable, the compiler 20a returns to step S1 to repeat the same processes. If there exists no unprocessed variable, the compiler 20a proceeds to step S6.

[S6] The compiler 20a performs a compiling process on parts other than variables.

Figure 6:
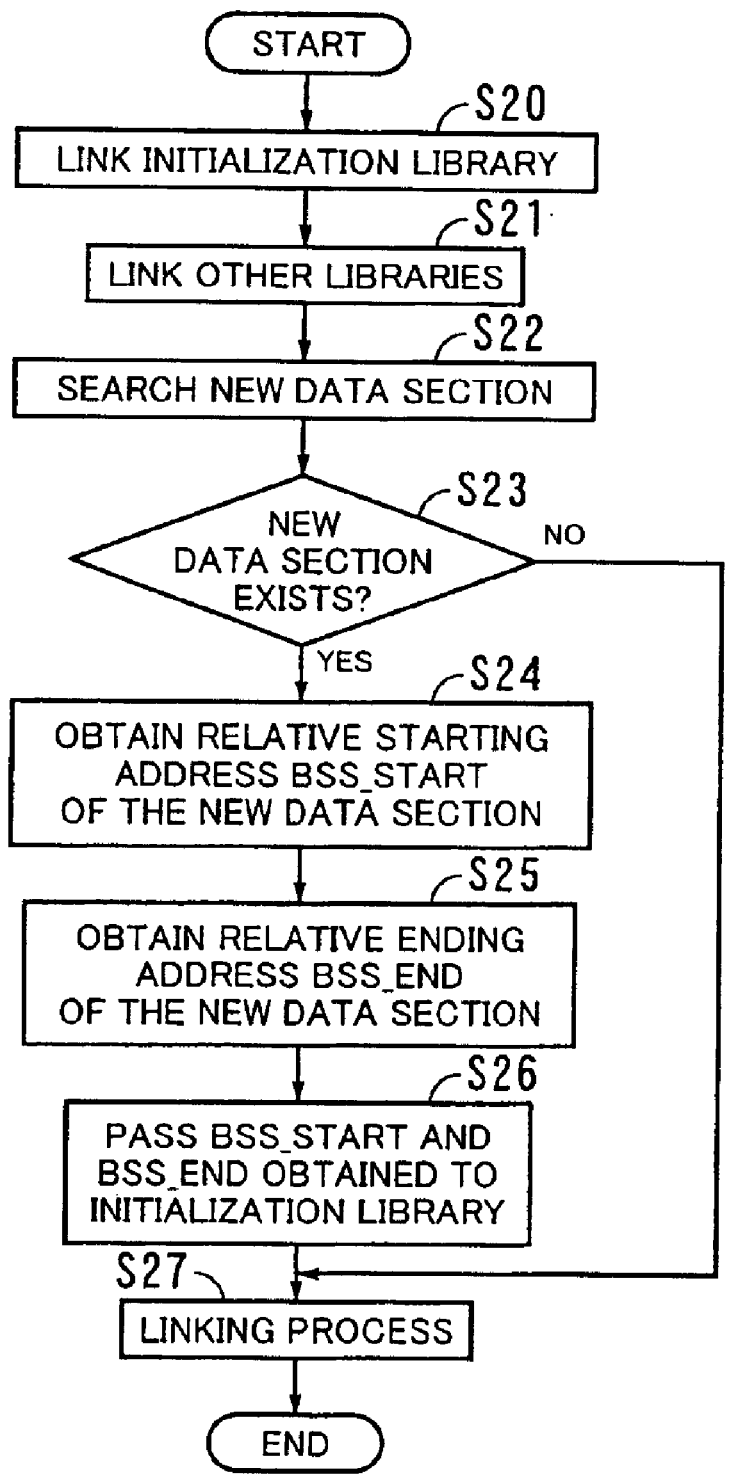
FIG. 6 is a flow chart for describing an example of processes performed by the linker shown in FIG. 3.

FIG. 6 is a flow chart for describing an example of processes performed by the linker 20b. The following procedure will be performed in compliance with this flow chart.

[S20] The linker 20b performs the process of linking the initialization library 22a.

[S21] The linker 20b performs the process of linking other libraries (mathematical function library, for example).

[S22] The linker 20b searches an object file for object code regarding a new data section.

[S23] The linker 20b judges whether there exists object code regarding a new data section. If there exists object code regarding a new data section, the linker 20b proceeds to step S24. If there exists no object code regarding a new data section, the linker 20b proceeds to step S27.

[S24] The linker 20b obtains relative starting address bss_start of the new data section.

[S25] The linker 20b obtains relative ending address bss_end of the new data section.

[S26] The linker 20b passes relative addresses bss_start and bss_end obtained to the initialization library 22a.

Specifically, the linker 20b, for example, embeds these relative addresses in a predetermined area of the initialization library 22a.

[S27] The linker 20b performs a linking process.

Figure 7:
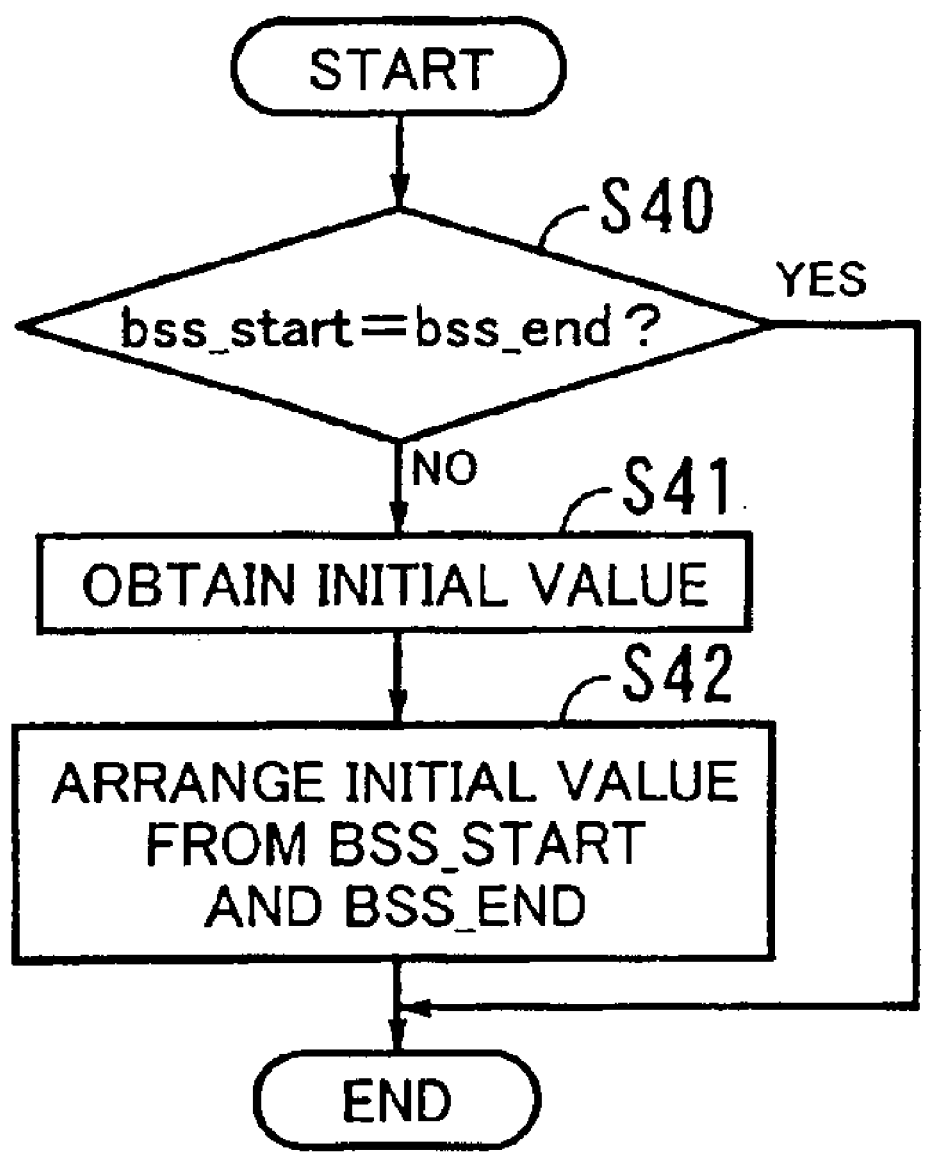
FIG. 7 is a flow chart for describing an example of processes performed by the initialization library shown in FIG. 4.

An example of processes performed by the initialization library 22a will now be described with reference to FIG. 7. The following procedure will be performed when the load module 32 is executed and is arranged in the RAM 10c.

[S40] The CPU 10a judges whether the values of relative addresses bss_start and bss_end embedded in the load module 32 are equal. If they are equal, then the CPU 10a ends the procedure. If they are not equal, then the CPU 10a proceeds to step S41.

These values being equal means the default state in which relative addresses are not written. In that case, there exists no dynamic variable to be initialized, so the CPU 10a ends the procedure.

[S41] The CPU 10a obtains an initial value supplied from the input device 12 at, for example, execution time.

This initial value can be specified at compile time and be stored in a predetermined area of the load module, as described later.

[S42] The CPU 10a arranges the initial value obtained in step S41 in the area in the RAM 10c specified by bss_start and bss_end.

With the above procedure, the processes described before can be realized. In the above examples, the number of data areas to be initialized is one. A plurality of data areas can be initialized by repeating the above procedure necessary times.

Now, the operations in this embodiment will be described more concretely.

First, how to allocate a target variable to a new data section will be described with reference to FIG. 8.

In an example shown in FIG. 8, arrays X1 and X2 are declared in the second line of a source file 40 and are given the same block name ALK. Furthermore, array X3 is declared in its third line and is given block name BLK.

When this source file 40 is compiled, an object file 41 will be generated. In this object file, the same data section is allocated to arrays X1 and X2 given the same block name. A data section allocated to array X3 is different from the above data section.

In this example, the allocation of data sections is performed according to block names. However, various allocation methods other than this are possible. For example, allocation according to the distinction between arrays and other variables, allocation according to the number of elements of arrays, allocation according to data types (four-byte integer, eight-byte integer, four-byte real number, and eight-byte real number), allocation according to variable names, and allocation according to procedure names are possible.

This is an example of automatic allocation of data sections by a compiler, but a programmer may specify directly by, for example, a compile option at compile time.

Whichever method is chosen, the desired variable alone can be initialized to the desired value by properly changing the allocation of data sections.

Now, if declarations about the same variable are dispersed in a source file, a process for integrating these variables will be described with reference to FIG. 9.

Figure 9:
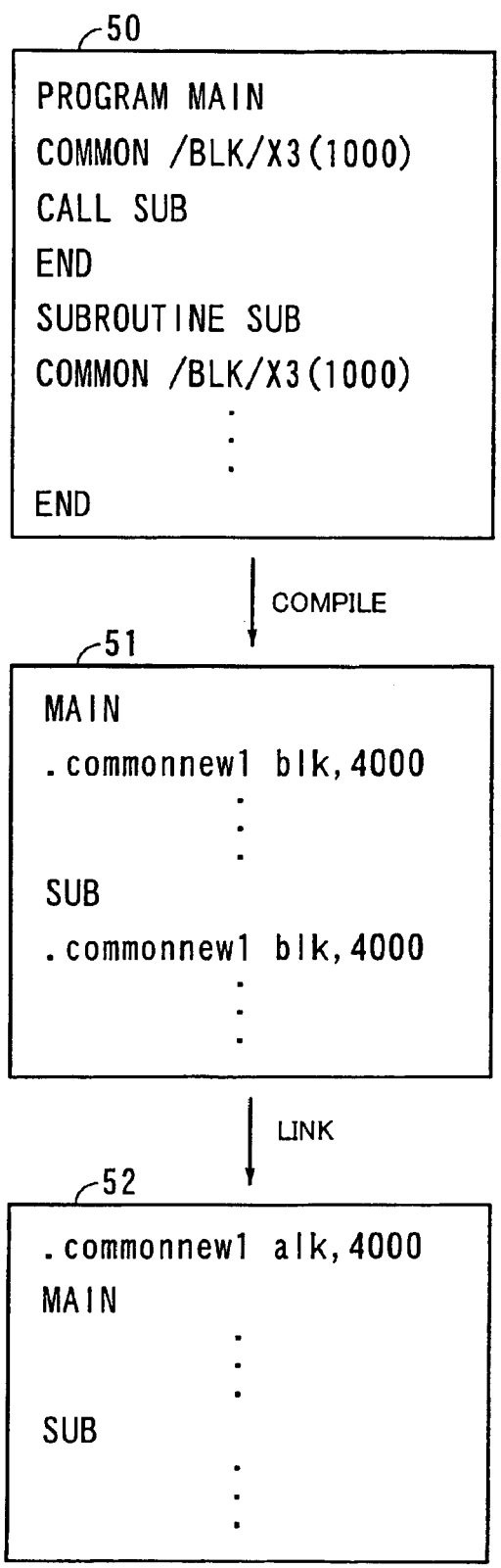
FIG. 9 is a view for describing a process for integrating, in the case of declarations about the same variable being dispersed in a source file, these variables.

In a source file 50 shown in FIG. 9, array X3 having block name BLK is declared in main program MAIN. Furthermore, the same array (array X3 having block name BLK) is declared in subroutine SUB.

An object file 51 which includes object code regarding a new data section in each of MAIN and SUB will be obtained by compiling this source file 50 with the compiler 20a.

When a linking process is performed on this object file 51 with the linker 20b, a link module 52 will be generated. In the link module 52, the object code regarding a new data section which existed separately in MAIN and SUB in the object file 51 is integrated into one.

Therefore, even if declarations about the same variable are dispersed in a source file, these can be integrated into one variable.

Now, if declarations about the same variable exist in a plurality of source files, a process for integrating these variables will be described with reference to FIG. 10.

Figure 10:
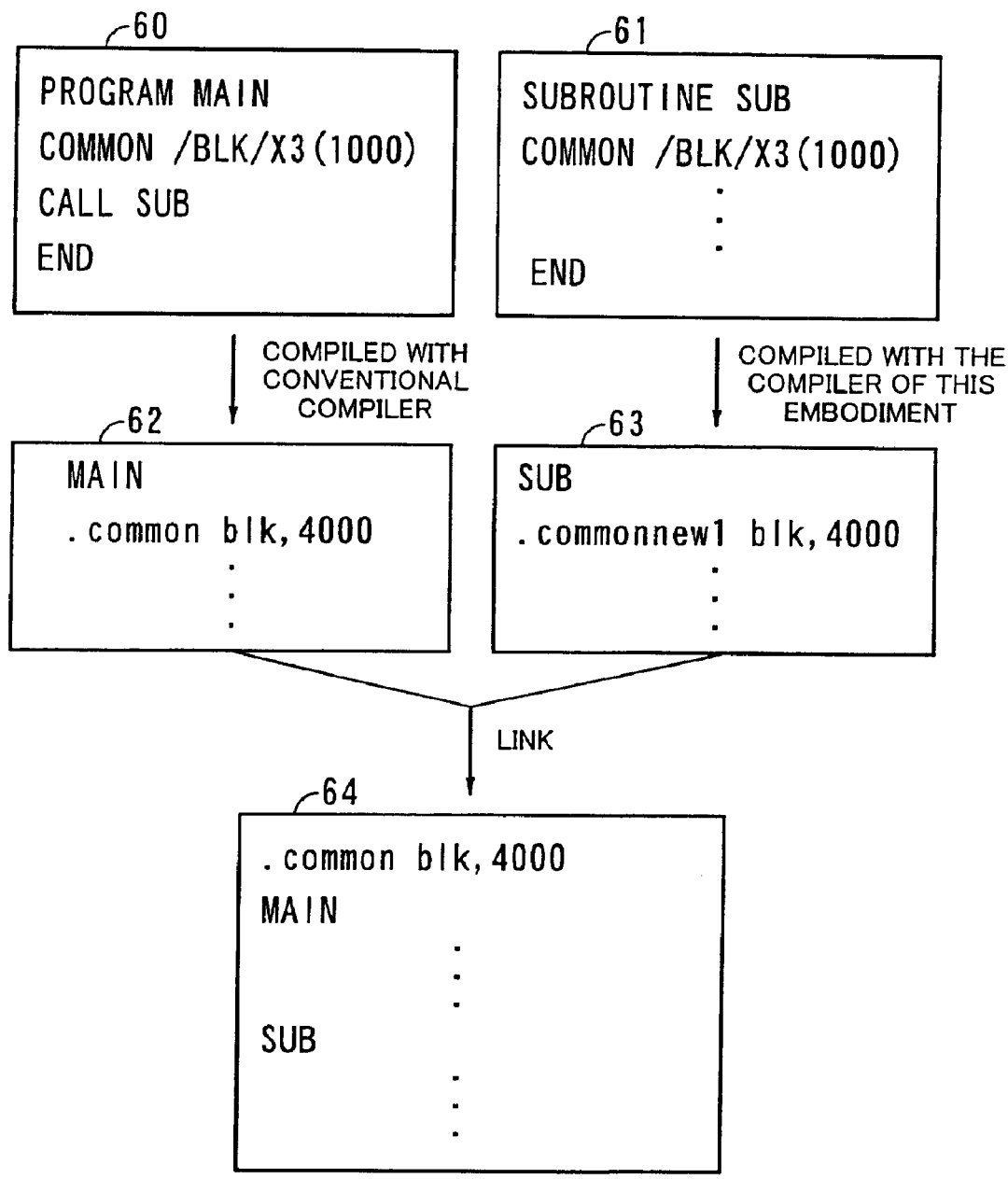
FIG. 10 is a view for describing a process for integrating, in the case of declarations about the same variable existing in a plurality of source files, these variables.

In an example shown in FIG. 10, array X3 having block name BLK is declared in MAIN in a source file 60; the same array X3 is declared in SUB in a source file 61. It is assumed that the source file 60 is compiled with a conventional compiler and that the source file 61 is compiled with the compiler 20a of this embodiment.

As a result, an ordinary data section is allocated to array X3 in an object file 62 and a new data section is allocated to array X3 in an object file 63.

When a linking process is performed on the object files 62 and 63, which are different from each other in type, with the linker 20b, the linker 20b compares data sections regarding the same arrays X3 included in the object files 62 and 63 and integrates both data sections into the ordinary data section because one is a new data section and the other is an ordinary data section.

As a result, a load module 64 in which an ordinary data section is allocated to both arrays X3 will be obtained, as shown in FIG. 10.

As stated above, when variables to which different data sections are allocated are integrated by a linking process, an ordinary data section is prioritized. This prevents the same variable from being allocated to different areas and therefore ensures the same operation as before.

In the above embodiment, both data sections are integrated into an ordinary data section. However, they may be integrated into a new data section. In that case, the operation of the object file 62 compiled with a conventional compiler cannot be ensured, but an undefined variable reference check can be done.

Methods for setting an initial value in the case of initializing a variable will now be described.

An initial value can be specified (1) at compile time or (2) at execution time. That is to say, there are two methods. Now, method (1) will be described first, and then method (2) will be described.

In method (1), an initial value is specified by entering a command to start a compiler and then the name of a source file and the initial value. As in the example shown in FIG. 8, it is assumed that two types of new data sections having block names ALK and BLK respectively exist and that ALK alone is initialized to the value of "8B." The name of a source file is "abc.f" and a command to start a compiler is "frt."

frt abc.f–X(A)=8B where "–" and the following characters make up a compile option and "X(A)" means that a new data section the block name of which begins with letter "A" is initialized to the value of "8B."

When a compile option is specified by the above command and a compiling process is performed, initial value "8B" will be embedded in a predetermined area of an object file generated. At execution time, this initial value is read out and target variables (arrays X1 and X2 for this example) are initialized to the value of "8B" specified.

Method (2) will be now described. It is assumed that the name of a load module file is "a.out" and that the new data section having block name BLK, shown in FIG. 8, is initialized to the value of "8B." The load module is started by:

a.out–X(B)=8B

By starting the load module in this way, a program can be executed after any variable is initialized to any value.

In the above examples, a new data section is initialized to hexadecimal number "8B," but it can be initialized to, for example, a non-number, In the example described before, the new data section having block name BLK is initialized to a non-number by:

a.out–X(B)=R4NaN where R4NaN means that the new data section is initialized to four-byte real (R) non-number (NaN: Not a Number).

With the above methods, any variable can be initialized to any value. If an initial value is specified at compile time and another initial value is specified at execution time, two initial values will exist. In such a case, one of them should be adopted preferentially.

Now, an example of undefined variable reference checks being done by the use of an initialized variable will be described.

First, the method of directly confirming the contents of a variable by adding an instruction to print out the contents of the initialized variable to source code will be described. This is the simplest method.

FIG. 11 shows an example of source files to which an instruction to print out the contents of a variable is added. In this example, array X having block name BLK is defined in the second line from the top and an instruction to print out the first contents of array X is added in the second line from the bottom. WRITE is an instruction to output, "6" enclosed in parentheses is an output device number (printer for this example), and (8Z) enclosed in single quotes means that the contents are output in hexadecimal.

If value "8B8B8B8B" is printed out when such a program is compiled with initial value "8B" specified as an option at compile time and is executed or when such a program is executed with initial value "8B" specified at execution time, the judgment that an undefined variable is referred to can be made.

Then an example of debug options being used extendedly at compile time will be described.

Conventionally, if debug option "–Du" is specified at compile time in FORTRAN, variables other than COMMON variables are initialized to value "8B." When a variable for which "8B" is substituted is referred to, message "undefined data was referred to" is displayed.

The function of this debug option "−Du" can be extended to COMMON variables by applying the present invention.

That is to say, if debug option "−Du" is specified, the function of debug option "−Du" can be extended to COMMON variables by automatically initializing COMMON variables to value "8B" and informing, in the case of "8B" being detected when they are referred to, that an error has occurred.

And then a method using a trap conforming to ANSI (American National Standards Institute)/IEEE (Institute of Electrical and Electronics Engineers) 754 standard will be described.

In conventional FORTRAN, by embedding an instruction to initialize a target variable to a non-number in a program and specifying option "−trap" at execution time, message "an invalid operation exception occurred" is displayed when the variable with its value undefined is referred to. In this embodiment, such a trap can be performed only by specifying an option for COMMON variables, being dynamic variables, at execution time.

Figure 12:
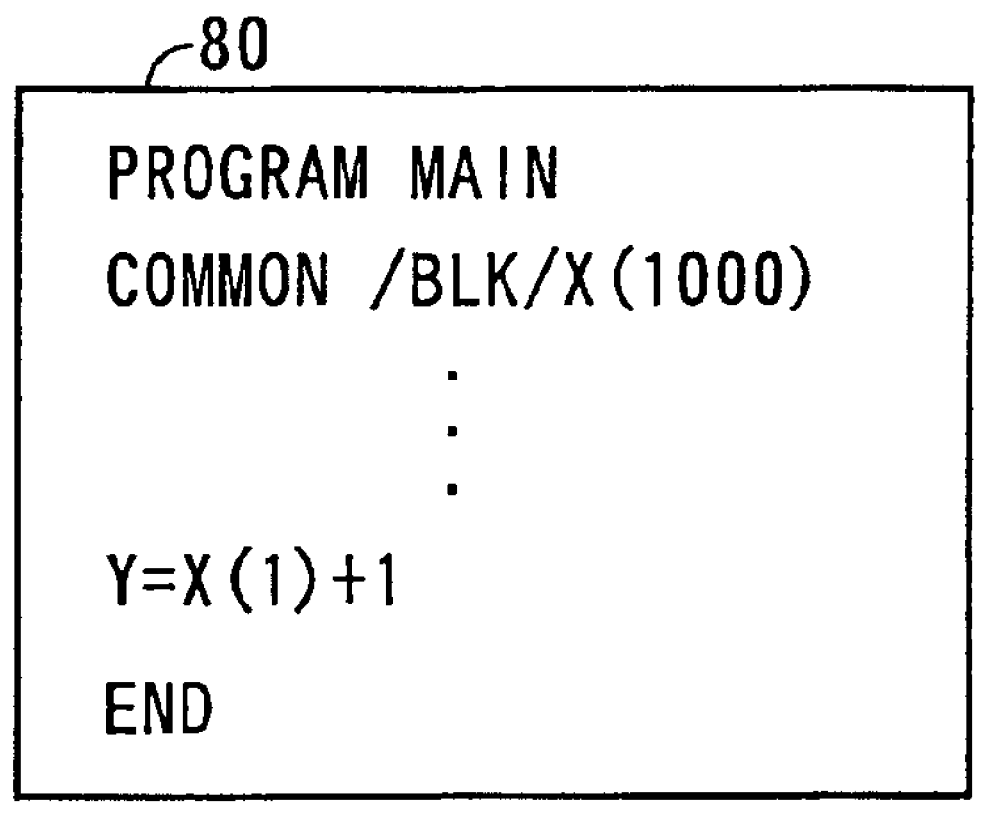

Now, a source file 80 shown in FIG. 12 in which array X having block name BLK is declared, remains undefined, and is referred to in the second line from the bottom will be described as an example.

It is assumed that the name of the source file 80 is a.f. First, the source file 80 is compiled with the compiler 20a by executing the following command:

frt a.f

Next, load module a.out obtained is executed. In this case, array X is initialized to a non-number and a trap option is specified, in the following manner:

a.out−X=R4NaN−trap

By specifying in the above manner, array X is initialized to a four-byte non-number and load module a.out is executed. When the assignment statement in the second line from the bottom in FIG. 12 is executed, the first element of array X is referred to. A non-number has been substituted for undefined array X, so the trap option operates and error message "an invalid operation exception occurred" described before will be displayed.

Now, judgment on whether or not a subscript outside a declared scope is used, which is passed when the contents of an array are referred to, will be described.

For example, it is assumed that there is a source file 90 shown in FIG. 13. In the source file 90, single-precision real-type arrays A and B each having 1,000 elements are declared in the second line.

Conventionally, object code which looks like the following is generated when such arrays are compiled:

.bss main.local,8000

With a compiler of this embodiment, however, object code which looks like the following is generated:

.bss main.local,8008

Figure 14:
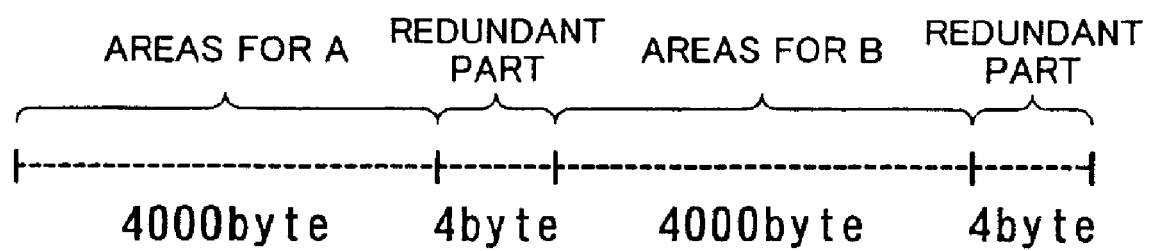
FIG. 14 is a view showing an example of array areas ensured in this embodiment.

That is to say, object code which ensures areas eight bytes more than the necessary areas is generated. A breakdown of 8008 bytes is shown in FIG. 14. As shown in FIG. 14, the first 4000 bytes of the 8008 bytes are allocated to array A, the subsequent four bytes are a redundant part, the subsequent 4000 bytes are allocated to array B, and the last four bytes are a redundant part.

In this embodiment, as stated above, when arrays are declared, a fixed number of extra areas, together with necessary areas, are ensured and these extra areas become a redundant part.

A redundant part ensured in this way can be used to check whether a subscript outside a declared scope was used. In other words, when all the areas ensured in this way are initialized to, for example, a non-number, the non-number will be stored only in the redundant part if an array is initialized suitably. And if specifying a trap option at execution time displays message "an invalid operation exception occurred," then there is a strong possibility that a subscript outside the declared scope was used. In the example shown in FIG. 13, for example, an array subscript from 1 to 1001 is used in the second DO loop (sixth through eighth line); the above error will be displayed when a subscript is 1001.

This message alone does not show whether an array subscript outside a declared scope was used or whether another error occurred, but it can suggest the possibility that an array subscript outside a declared scope was used. Conventionally, even if an array subscript outside a declared scope is used, no message is displayed, which makes it difficult even to notice an error. In this embodiment, however, it is possible to notice the possibility that an error occurred.

By combining the above embodiment and the method described before, an array subscript check can be done on an array being a dynamic variable.

In this embodiment, a conventional debug option is utilized, which can save the trouble of creating a new program and prevent a decrease in overall processing speed resulting from processing a new option added.

The above embodiment has been described with FORTRAN as a main example, but the present invention is applicable to other languages, such as C.

Furthermore, in the above method for initializing a dynamic variable, an area in a memory where a dynamic variable is stored is passed to an initialization library as a relative address. However, the present invention is not limited to such a case. For example, the following method may be used. When a load module is executed, predetermined identification symbols are located before and behind an area in a memory where a dynamic variable is stored. The area enclosed by these identification symbols is detected by an initialization library and is initialized to a specified value. In a word, it is necessary to inform an initialization library of an area in a memory where a dynamic variable is stored.

Finally the above procedure can be achieved with a computer. In that case, the contents of a function which an information processing apparatus must have are described in a program recorded on a record medium which can be read with a computer. The above procedure is achieved with a computer by executing this program on the computer. A record medium which can be read with a computer can be a magnetic recording medium, a semiconductor memory, or the like. In order to place this program on the market, it can be stored on a portable record medium, such as a compact disk read only memory (CD-ROM) or a floppy disk. Alternatively, it can be stored in a memory of a computer connected via a network and be transferred to another computer via a network. When this program is executed on a computer, it is stored on a hard disk etc. in the computer and is loaded into a main memory.

As described above, an information processing apparatus for translating a source file including dynamic variables into an object file by a compiling process and converting it into an executable load module by a linking process according to the present invention comprises dynamic variable specifying means for specifying a target dynamic variable from the source file, area specifying means for specifying areas ensured in the case of a dynamic variable specified by the dynamic variable specifying means being developed into a memory at the time of executing the load module, and initializing means for initializing areas specified by the area specifying means to a predetermined value. An undefined variable reference check on a dynamic variable therefore can be done.

In addition, an information processing apparatus for translating a source file including an array into an object file by a compiling process and converting it into an executable load module by a linking process according to the present invention comprises array specifying means for specifying a target array from the source file, area ensuring means for ensuring, at the time of executing the load module, areas in a memory being a predetermined number of bytes more than areas declared in an array specified by the array specifying means, and initializing means for initializing areas ensured by the area ensuring means to a predetermined value. Therefore, it is possible to detect that a subscript outside a declared scope was used in an array.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An information processing apparatus for translating a source file including dynamic variables and static variables into object files by a compiling process and converting the object files into executable load modules by a linking process, the apparatus comprising:
   dynamic variable specifying means for specifying a target dynamic variable from the source file;
   area specifying means for specifying areas in a memory ensured in the case of the dynamic variable specified by the dynamic variable specifying means being developed into the memory at the time of executing the load module; and
   initializing means for initializing areas specified by the area specifying means to a predetermined value;
   wherein the specified areas are determined by obtaining starting and ending addresses in an object file where an object code relating to the target dynamic variable is stored.

2. The information processing apparatus according to claim 1, further comprising area integrating means for integrating areas ensured in the case of a plurality of different dynamic variables specified by the dynamic variable specifying means being developed into the memory.

3. The information processing apparatus according to claim 1, further comprising variable integrating means for integrating the same dynamic variables dispersed in one or more object files integrated by the linking process.

4. The information processing apparatus according to claim 1, wherein the dynamic variable specifying means allocates the target dynamic variable to a new data section, further wherein the initializing means performs an initializing process on a dynamic variable alone allocated to the new data section.

5. The information processing apparatus according to claim 4, wherein when a plurality of object files are linked to generate the load module, the initializing means does not perform an initializing process on the dynamic variable which is allocated to the new data section in a predetermined object file and is allocated to an ordinary data section in another object file.

6. The information processing apparatus according to claim 1, further comprising initial-value entering means for entering an initial value used by the initializing means before a compiling process.

7. The information processing apparatus according to claim 1, further comprising initial-value entering means for entering an initial value used by the initializing means before executing the load module.

8. The information processing apparatus according to claim 1, further comprising initialized variable specifying means for specifying the dynamic variable on which the initializing process is performed.

9. The information processing apparatus according to claim 1, further comprising error informing means for informing of an error in the case of a dynamic variable which holds the initial value being referred to at the time of executing the load module.

10. The information processing apparatus according to claim 9, further comprising memory ensuring means for ensuring memory areas being a predetermined number more than the number of elements of an array declared in source code if the dynamic variable is an array, wherein the initializing means initializes all areas in a memory ensured by the memory ensuring means to a predetermined value, further wherein the error informing means informs of an error in the case of an array which holds the initial value being referred to.

11. A computer-readable record medium recording a computer program for translating a source file including dynamic variables and static variables into an object file by a compiling process and converting the object file into an executable load module by a linking process, the program comprising the functions of:
   specifying a target dynamic variable from the source file;
   specifying areas in a memory ensured in the case of the dynamic variable specified being developed into the memory at the time of executing the load module; and
   initializing areas specified to a predetermined value,
   wherein the specified areas are determined by obtaining starting and ending addresses in an object file where an object code relating to the target dynamic variable is stored.

* * * * *